Nov. 30, 1926. 1,608,494
C. P. DEIBEL
TERMINAL FOR BATTERIES AND THE LIKE
Filed Feb. 19, 1923
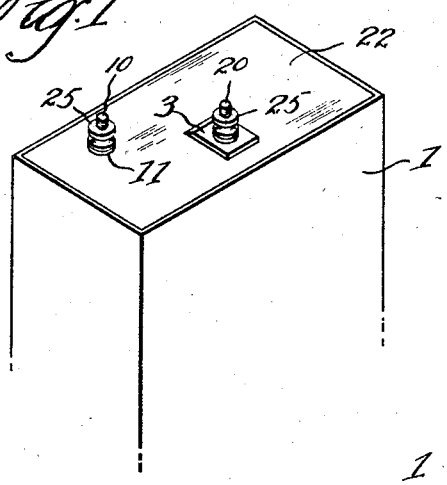
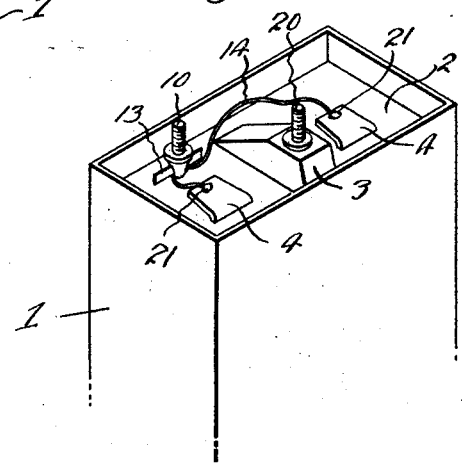
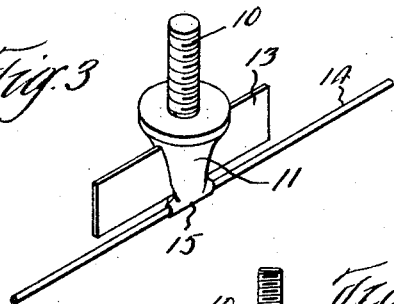
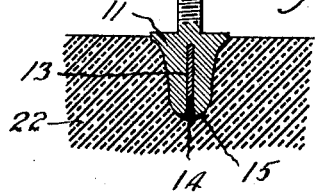
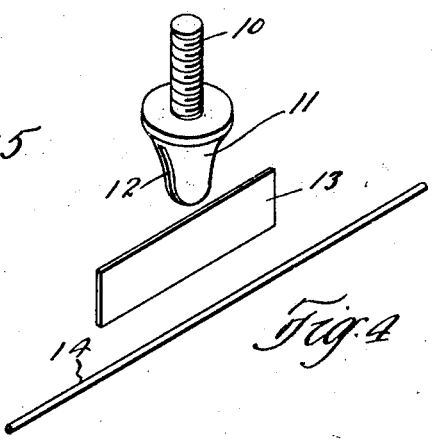
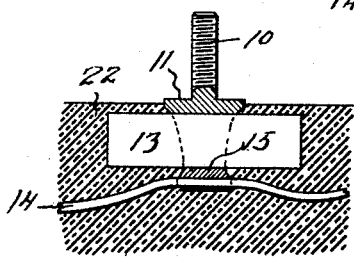
Inventor
By Cyril P. Deibel
Hull, Brock & West
Attys.

Patented Nov. 30, 1926.

1,608,494

UNITED STATES PATENT OFFICE.

CYRIL P. DEIBEL, OF YOUNGSTOWN, OHIO, ASSIGNOR TO THE TWIN DRY CELL BATTERY COMPANY, OF CLEVELAND, OHIO, A CORPORATION OF OHIO.

TERMINAL FOR BATTERIES AND THE LIKE.

Application filed February 19, 1923. Serial No. 619,823.

This invention relates to a terminal for use with electrical devices of the kind wherein the terminal is embedded in a body of hardened material, and it also embraces the method of emplacing or properly positioning the terminal within the material while the latter is in a plastic condition, the material after it hardens serving to support and maintain the terminal in place.

The invention is especially suitable for use with so-called dry-cell batteries, particularly of the type known as twin-dry-cell batteries, examples of which are found in the patent to Herbert R. Palmer, No. 1,271,933, and in my prior application, Serial No. 612,232, filed January 12, 1923, which covers a process of producing batteries particularly of the type referred to. From this reference to twin dry-cell batteries, it is not to be taken that the invention is in any way limited to use with batteries of that class. A battery of a similar nature in connection with which the present invention is as well adapted for use is shown in the joint application of myself and Walter G. Waitt, Serial No. 602,939, filed November 24, 1922.

Another class of devices wherewith my invention may be advantageously employed is that of electrical heating units of the embedded type, i. e., of the type wherein the resistor element is encased in a suitable embedding material, the invention providing a terminal which may be connected to a flexible conductor and adjusted to proper position while the embedding material is in a plastic condition and which will be held in such position by the material after it hardens.

In applying terminals to the elements of electrical devices of the character mentioned, especially batteries, it has been the practice heretofore to rigidly secure, usually by soldering, the terminal or binding post to the element. Unless considerable skill is employed in making the connection, and care is exercised to prevent its disturbance, and caution taken to avoid deformed or misplaced elements, it very frequently happens that the terminal is out of proper position or is crooked, which impairs the appearance and, to that extent at least, the value of the battery or other electrical device.

It is the aim of my present invention to provide a simple and inexpensive terminal which may be connected, through a flexible conductor, to an electrode or electrodes of a battery, and embedded in and supported and maintained in proper position by a suitable sealing compound which may be poured into the battery while in a semi-fluid condition and which will permit adjustment of the terminal to its ultimate position while the compound is in plastic condition; or, in the case of electrical heating devices or the like, may be similarly connected to the resistor and likewise embedded and adjusted within the mass of embedding material.

By the use of such a terminal and the method of emplacing it, the manufacture of batteries or other electrical devices is greatly facilitated, expedited and accordingly cheapened.

More limited objects are to provide a terminal incorporating a flexible conductor and having one or more wings or other anchorage parts which, when embedded within suitable hardened material, will effectively maintain the terminal in a proper fixed position; and to produce such a terminal by the employment of a binding post having a grooved or slotted head within the bifurcation or slot whereof a fin and a flexible conductor are secured by suitable means, as by a deposit of solder.

These objects, with others hereinafter appearing, are attained in the construction illustrated in the accompanying drawing and realized through the method hereinafter set forth.

In the drawing, Figs. 1 and 2 are fragmentary perspective views of a battery equipped with a terminal constructed and emplaced in accordance with my invention, Fig. 1 showing the finished battery, while Fig. 2 illustrates it prior to being sealed; Fig. 3 is an enlarged perspective view of the terminal; Fig. 4 is a similar view showing the parts of the terminal in separated condition; and Figs. 5 and 6 are sectional details of the terminal showing it embedded.

Briefly, the battery wherewith I have elected to show my improvements associated comprises a container 1 which is filled to within a suitable distance of its top with electrolyte or "mix", designated 2, and within which are compressed a cathode 3 and anodes 4 and 5, the battery being of the so-called "twin" type.

In its present preferred form, my improved terminal comprises a binding post 10 having a head 11 that is slotted or grooved at 12 for the reception of a fin 13 and a flexible conductor 14. The central portion of the fin 13 is inserted within the groove or slot 12 and the conductor 14, which may be in the nature of a soft copper wire, is laid into the widened end of the groove and a quantity of solder is deposited at the junction of the conductor and head and flows about the same and into the groove or slot, binding the fin 13 as well as the conductor 14 to the head after the solder hardens. The deposit of solder is indicated at 15.

The cathode 3, which, in the present form of battery, consists of a flat bar of carbon, is provided with a binding post 20, and by reason of the stable character of the cathode, the rigid connection of the binding post 20 thereto, and the method of assembling the parts as disclosed in my prior application Serial No. 612,232, hereinbefore referred to, the proper position and alignment of the binding post 20 is assured. However, this is not true of the binding post or posts of the anodes, as heretobefore connected, because the anodes, being composed of pliable material, such as sheet zinc, are easily deformed and their positions readily shifted within the mix enough to throw the binding post or posts out of proper alignment.

These difficulties are entirely avoided by the use of my improved terminal and the method of emplacing it. In applying the terminal to the anodes, the ends of the conductor 14 are secured to the respective anodes 4 and 5, as by solder 21. The battery is then sealed by pouring into the upper end of the container a quantity of sealing compound, indicated at 22, which encases the ends of the anodes 4 and 5, the conductor 14, and the head 11; and while the sealing compound is in plastic condition, the binding post or terminal 10 may be adjusted to proper position and into parallelism with the terminal or binding post 20 with the flat surface of the head 11 slightly above the surface of the sealing compound. The sealing compound, when it hardens about the conductor 14 and the fin 13, effectively imprisons these parts so that the terminal or binding post 10 is held in a fixed position.

The usual thumb nuts 25 are applied to the terminals or binding posts 10 and 20. The relatively broad surface of the fin 13 very effectively holds the binding post 10 against turning in the hardened sealing compound when the nut is manipulated to clamp a wire or other conductor between the lower end thereof and the adjacent flat face of the head 11.

While I have described in detail the present preferred embodiment of the invention, it will be understood that changes and alterations may be made without departing from the invention so long as they fall within the scope of the claims appended hereto. Furthermore, I have, in the present disclosure, shown my improved terminal as applied only to anodes. Obviously it may be advantageously employed with both electrodes of a battery.

Having thus described my invention, what I claim is:

1. A terminal for dry cells comprising a threaded shank having its lower portion terminating in a head having a groove therein, a fin arranged within said groove, a flexible conductor engaging in said groove and rigidly secured thereto and adapted to effect intimate electrical connection between said terminal and one of the electrodes of a cell.

2. A terminal for dry cells comprising a shank portion and a head portion adapted to be embedded within the sealing material of the cell, said head portion having a fin rigidly secured thereto adapted to interlock with the sealing material to prevent relative movement between the terminal and the sealing medium, a flexible conductor rigidly secured to said head portion and adapted to connect said terminal with one of the electrodes of a cell.

3. A terminal for use with electrical devices of the character described having a head, the head being provided with a transverse groove, a fin extending laterally through said groove, a flexible conductor, and means securing the fin and a part of said conductor within the groove.

4. A terminal for use with electrical devices of the character described comprising a threaded shank which terminates at one end in a head that is adapted to be encased within embedding material, said head having a transverse groove that is substantially in axial alignment with the shank, a fin extending through said groove, a flexible conductor in the nature of a wire engaged within the outer end of the groove, and a deposit of solder holding the conductor and fin within the groove and effecting intimate electrical connection between the conductor and the head.

5. In combination with a battery cell involving a cathode and anodes disposed on opposite sides of the cathode, a terminal incorporating a flexible conductor having its opposite ends connected to the respective anodes, and a hardening sealing compound closing the battery and encasing the flexible conductor and a part of the terminal and supporting and maintaining the terminal in proper position, the flexible conductor permitting relative adjustment between the terminal and anodes before the sealing compound hardens.

6. In combination with a battery cell involving a cathode and anodes disposed on opposite sides of the cathode, a terminal incorporating a flexible conductor having its opposite ends connected to the respective anodes, and a hardening sealing compound closing the battery and encasing the flexible conductor and a part of the terminal and supporting and maintaining the terminal in proper position, the terminal consisting of a threaded shank which extends above the sealing compound and a head extending therebelow to which the flexible conductor is connected, the head having a lateral extension coacting with the sealing compound to resist displacement of the terminal, the flexible conductor permitting relative adjustment between the terminal and anodes before the sealing compound hardens.

7. A terminal for dry cells comprising a threaded shank terminating at one end in a head portion adapted to be embedded within the sealing material of the cell, said head portion having a recess therein and a fin secured in said recess and extending outwardly from said head and serving to prevent rotation of said terminal with respect to said sealing material and a flexible conductor rigidly connected with said head portion and effecting intimate electrical connection between said terminal and one of the electrodes of said cell.

In testimony whereof, I hereunto affix my signature.

CYRIL P. DEIBEL.